US008842625B2

(12) United States Patent
Bark et al.

(10) Patent No.: US 8,842,625 B2
(45) Date of Patent: Sep. 23, 2014

(54) WIRELESS SCHEDULING CONSIDERING OVERHEAD COST ESTIMATE

(75) Inventors: Gunnar Bark, Linköping (SE); Eva Englund, Linköping (SE); Erik Larsson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 54 days.

(21) Appl. No.: 13/501,324

(22) PCT Filed: Oct. 14, 2009

(86) PCT No.: PCT/SE2009/051168
§ 371 (c)(1),
(2), (4) Date: Apr. 11, 2012

(87) PCT Pub. No.: WO2011/046475
PCT Pub. Date: Apr. 21, 2011

(65) Prior Publication Data
US 2012/0207120 A1 Aug. 16, 2012

(51) Int. Cl.
H04W 72/04 (2009.01)
H04W 72/12 (2009.01)
H04L 5/00 (2006.01)
(52) U.S. Cl.
CPC ......... H04W 72/1231 (2013.01); H04L 5/0064 (2013.01)
USPC ........................................... 370/329
(58) Field of Classification Search
CPC ... H04W 28/04; H04W 72/04; H04W 72/042; H04W 88/08; H04L 5/0007
USPC ............................. 370/329; 341/20
See application file for complete search history.

(56) References Cited

U.S. PATENT DOCUMENTS 7,769,390 B2 * 8/2010 Kim et al. .................. 455/452.2
7,929,962 B2 * 4/2011 Bachl et al. ................... 455/424
(Continued)

FOREIGN PATENT DOCUMENTS

EP 1950905 A1 7/2008
WO 2005122506 A1 12/2005

OTHER PUBLICATIONS

A Packet Scheduling Algorithm Supporting Multimedia Traffic over the HSDPA Link based on Early Delay Notification, Assen Golaup, Oliver Holland, and A. Hamid Aghvami, Centre for Telecommunications Research King's College London.*

(Continued)

*Primary Examiner* — Mark Rinehart
*Assistant Examiner* — Peter Solinsky
(74) *Attorney, Agent, or Firm* — Murphy, Bilak & Homiller, PLLC

(57) ABSTRACT

The present solution provides a method in a base station (110) for selecting one or more user equipments (120) to be scheduled for a transmission. After receiving (201) channel state information from the respective one or more user equipments (120), the base station (110) estimates (202) the throughput of the transmission of the respective one or more user equipments (120). The throughput is based on the received channel state information. The base station (110) further estimates (203) the consumption of throughput that is expected for transmitting scheduling information to each of the respective one or more user equipments (120). The base station then selects (204) the respective one or more user equipments (120) to be scheduled for transmission based on a criterion. The criterion is based on the estimated throughput and the estimated consumption of throughput that is expected for transmitting the scheduling information to the respective one or more user equipments (120).

24 Claims, 4 Drawing Sheets

(56) References Cited

U.S. PATENT DOCUMENTS

| | | | |
|---|---|---|---|
| 8,004,977 B2* | 8/2011 | Vitebsky et al. | 370/230 |
| 8,068,445 B2* | 11/2011 | Liu et al. | 370/280 |
| 8,068,471 B2* | 11/2011 | Kim et al. | 370/339 |
| 8,116,267 B2* | 2/2012 | van Rensburg et al. | 370/329 |
| 8,165,588 B2* | 4/2012 | Yu et al. | 455/442 |
| 8,249,013 B2* | 8/2012 | Kuri et al. | 370/329 |
| 8,306,541 B2* | 11/2012 | Laroia et al. | 455/450 |
| 8,385,287 B2* | 2/2013 | Kuri et al. | 370/329 |
| 8,483,105 B2* | 7/2013 | Nanda et al. | 370/278 |
| 2003/0125040 A1* | 7/2003 | Walton et al. | 455/454 |
| 2005/0220052 A1* | 10/2005 | Uehara et al. | 370/331 |
| 2005/0270975 A1* | 12/2005 | Meylan et al. | 370/229 |
| 2006/0165029 A1* | 7/2006 | Melpignano et al. | 370/328 |
| 2007/0117570 A1* | 5/2007 | Noh et al. | 455/452.2 |
| 2007/0133556 A1* | 6/2007 | Ding et al. | 370/395.4 |
| 2007/0195741 A1 | 8/2007 | Cho et al. | |
| 2008/0212591 A1* | 9/2008 | Wu et al. | 370/395.21 |
| 2008/0219194 A1 | 9/2008 | Kim et al. | |
| 2008/0250142 A1* | 10/2008 | Magnusson et al. | 709/225 |
| 2009/0097444 A1* | 4/2009 | Lohr et al. | 370/329 |
| 2009/0135766 A1 | 5/2009 | Vitebsky et al. | |
| 2009/0310547 A1* | 12/2009 | Yokoyama | 370/329 |
| 2010/0315989 A1* | 12/2010 | Reznik et al. | 370/315 |
| 2011/0064018 A1* | 3/2011 | Hottinen | 370/315 |
| 2011/0261789 A1* | 10/2011 | Vitebsky et al. | 370/331 |
| 2011/0317565 A1* | 12/2011 | Krishnamurthi et al. | 370/251 |
| 2012/0307761 A1* | 12/2012 | Zhang et al. | 370/329 |
| 2013/0028307 A1* | 1/2013 | Ren et al. | 375/224 |
| 2013/0083763 A1* | 4/2013 | Futagi et al. | 370/329 |
| 2013/0114543 A1* | 5/2013 | Whinnett et al. | 370/329 |
| 2013/0142154 A1* | 6/2013 | Gorokhov et al. | 370/329 |

OTHER PUBLICATIONS

Channel Aware Scheduling in MU-DCF WLANs, Jelena Mirkovic, Bernhard Walke, and Jing Zhao, 1-4244-1312-5/07, IEEE, 2007.*

On End-to-End Scheduling in Wireless Cellular Networks, Walid Saad1, Zaher Dawy1, and Sanaa Sharafeddin, IEEE, 2008.*

Spectral Efficiency of Channel-Aware Schedulers in Non-Identical Composite Links with Interference, Jingxian Wu, Neelesh Mehta, Andreas Molisch, Jin Zhang, Mitsubishi Electric Research Laboratories, TR2007-065 Aug. 2007.*

Link Adaptation for Video Multicasting in Mobile WiMAX Network, Jianfeng Chen, IEEE Member, Ning Liao, Yntao Shi, Jun Li Corporate Research Beijing, Thomson Broadband R&D Co. Ltd., 978-1-4244-2309-5/09, IEEE 2009.*

Scheduling Algorithms for 3GPP Long-Term Evolution Systems: From a Quality of Service Perspective Mikael Gidlund and J-C Laneri, 978-1-4244-2204-3/08/ IEEE, 2008.*

* cited by examiner

WIRELESS SCHEDULING CONSIDERING OVERHEAD COST ESTIMATE

TECHNICAL FIELD

The present invention relates to a base station and a method in the base station. In particular, it relates to selecting a user equipment to be scheduled for transmission.

BACKGROUND

In a typical cellular radio system, also referred to as a wireless communication system, user equipments, also known as mobile terminals and/or wireless terminals communicate via a Radio Access Network (RAN) to one or more core networks. The user equipments can be mobile stations or user equipment units such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "eNB", "NodeB" or "B node" and which in this document also is referred to as a base station. A cell is a geographical area where radio coverage is provided by the radio base station equipment at a base station site. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies such as High Speed Packet Access (HSPA). In the end of 2008 the first release, Release 8, of the 3GPP Long Term Evolution (LTE) standard was finalized and the release 9 is currently going on.

Orthogonal Frequency-Division Multiple Access (OFDMA) is a common downlink multi-access method in many wireless broadband systems contemplated for the future, such as 3GPP-Long Term Evolution (LTE) and Worldwide Interoperability for Microwave Access (WiMAX). One of the main advantages of OFDMA is that user equipments can be scheduled for transmission and reception precisely in the specific time and frequency slots where they have good channel gains.

One basic feature of OFDMA is that all user equipments have to be informed which sub-carriers that they have been assigned for communicating with a base station over the air interface, and possibly what OFDM symbols in time, if the system uses time scheduling. This requires signalling of control information comprising of scheduling maps, so that the user equipments know which resource blocks in the time and frequency space to receive. Furthermore, the RBS typically informs the user equipments which transport formats such as e.g. coding and modulation, the downlink data is conveyed with. In this document, the scheduling maps and transport formats are denoted to be the so called scheduling information, which the RBS signals to the user equipments.

In LTE, the scheduling information is signalled dedicated to each user equipment on the Physical Downlink Control Channel (PDCCH), which PDCCH share the same downlink time, frequency and transmission power resources as the shared channel carrying the user data (PDSCH).

Wideband Code Division Multiple Access (WCDMA) is another multi-access method, where users receive their data on different downlink channelization codes. In High-Speed Downlink Packet Access (HSDPA), where all users share the same High-Speed Downlink Shared Channel (HS-DSCH) for data, they also need to be informed about the scheduling information, i.e. the downlink channelization codes and the transport format of the transmission. So here, the scheduling information comprises HS-DSCH channelization code and transport format, which is signalled on the High Speed Shared Control Channel (HS-SCCH). This signalling share the same downlink channelization code and base station power resources as the data on HS-DSCH.

In both LTE and WCDMA, it is the task of a downlink scheduler in a base station to divide the total power, time and frequency, or channelization code resources between user equipments need, i.e. to schedule the data and signalling to each user onto the sub-carriers for each time slot. This is typically done based on scheduling priority composed of several factors, such e.g.:

User equipment channel quality. User equipments with better relative channel quality are prioritized. A user equipment reported channel quality may be seen as an estimate of the user equipment's data throughput on the corresponding radio resource, if scheduled.

Radio access bearer priority. Bearers carrying signalling, emergency calls, etc. are prioritized.

Service requirements, through the Quality of service Class Indicator (QCI)

User priority. "Gold subscriptions" are prioritized.

Delay. Data packets from delay-sensitive services are prioritized when the packets are close to reach their critical delay limit.

Interference coordination

Etc.

Experience from LTE simulations has shown that the overhead associated with the signalling of scheduling information to all user equipments can be substantial. In particular if many user equipments are scheduled in the same time slot. This means that transmission of such scheduling information consumes resources that could otherwise have been used for payload data.

In WCDMA, the scheduling information is signaled on the HS-SCCH, which has the capability to signal scheduling information to at the most four user equipments per time slot. So signalling scheduling information consumes base station transmission power for each user equipment, but also an additional channelization code with spreading factor 128 for each 4th additional user equipment to be scheduled.

In state of the art schedulers, this consummation of signalling power is not considered when choosing which user equipments to schedule on each sub-carrier i.e.

channelization code in HSDPA, for each slot. As described above, the estimated user throughput is instead typically based solely on the user equipment measured and reported channel quality for the various sub-carriers in LTE, i.e. for the whole bandwidth in WCDMA. This makes the scheduling decisions, also with respect to physical layer throughput, while different scheduling information require different amount of signalling radio resources, leaving different amount of available radio resources for the actual payload data to be conveyed.

For example, the well-known max-SIR scheduler, where the user with the best estimated Signal-to-Noise and Interference Ratio (SIR) is scheduled, which for every sub-carrier and time slot in LTE, schedules the user equipment having the largest signal-to-interference ratio, is generally known for maximizing the system's physical layer throughput. However, that is not generally true since max-SIR scheduling often yields a fragmented scheduling map with many user equipments scheduled each time slot, which consumes a lot of power to signal to the user equipments.

SUMMARY

It is therefore an object of the invention to provide a mechanism for selecting a user equipment to be scheduled for transmission with an improved overall system throughput.

According to a first aspect of the invention, the object is achieved by a method in a base station for selecting one or more user equipments to be scheduled for a transmission. The base station is comprised in a wireless communications network. After receiving channel state information from the respective one or more user equipments, the base station estimates the throughput of the transmission of the respective one or more user equipments. The throughput is based on the received channel state information. The base station further estimates the consumption of throughput that is expected for transmitting scheduling information to each of the respective one or more user equipments. The base station then selects the respective one or more user equipments to be scheduled for transmission based on a criterion. The criterion is based on the estimated throughput and the estimated consumption of throughput that is expected for transmitting the scheduling information to the respective one or more user equipments.

According to a second aspect of the invention, the object is achieved by a base station for selecting one or more user equipments to be scheduled for a transmission. The base station is comprised in a wireless communications network. The base station comprises a receiver configured to receive channel state information from the respective one or more user equipments. The base station further comprises an estimating unit configured to estimate the throughput of the transmission of the respective one or more user equipments. The throughput is based on the received channel state information. The estimating unit further is configured to estimate the consumption of throughput that is expected for transmitting scheduling information to each of the respective one or more user equipments. The base station further comprises a scheduling unit configured to select the respective one or more user equipments to be scheduled for transmission based on a criterion. The criterion is based on the estimated throughput and the estimated consumption of throughput that is expected for transmitting the scheduling information to the respective one or more user equipments.

Since the base station selects the respective one or more user equipments to be scheduled for transmission taking into account the estimated consumption of throughput that is expected for transmitting the scheduling information to the respective one or more user equipments, the overall system throughput is improved.

BRIEF DESCRIPTION OF THE DRAWINGS

The invention is described in more detail with reference to attached drawings illustrating exemplary embodiments of the invention and in which.

DETAILED DESCRIPTION

Briefly described the present solution provides a base station which uses a throughput estimate for a user equipment and the overhead cost estimate of signalling the scheduling information to that user, as a priority component. The throughput measure is based on the user equipment reported channel state information, but adjusted with the data throughput decrease for informing the receiver the scheduling information. The present solution e.g. maximizes the system physical layer data throughput, by taking into account the amount of signalling needed to transmit e.g. scheduling maps to the users.

The present solution is applicable both for HSDPA scheduling and LTE scheduling.

Figure 1:
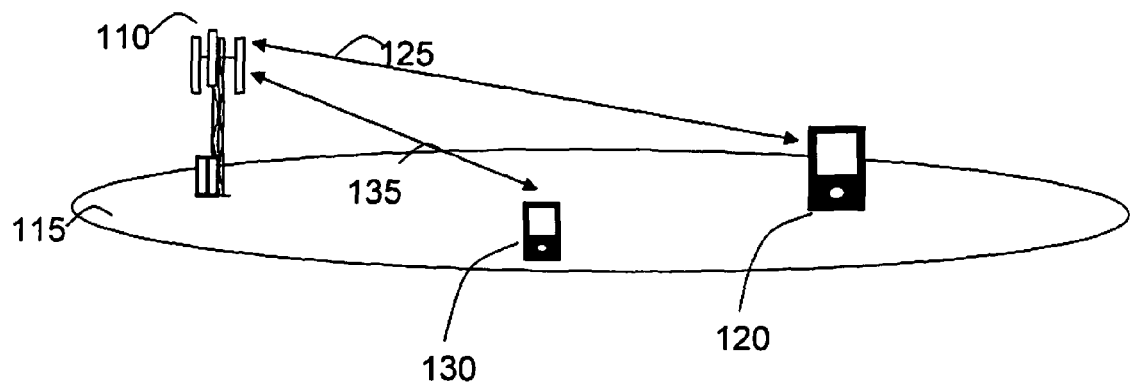
FIG. 1 is a schematic block diagram illustrating embodiments of a wireless communications system.

FIG. 1 depicts a wireless communications system 100. The wireless communications system 100 may be an LTE communications system using OFDMA technology, a WCDMA communications system using HSPA, any other wireless communications system using multi-access system.

The wireless communications system 100 comprises a base station 110 serving a cell 115. The base station 110 is a radio base station such as an eNB, a Radio Base Station (RBS) or any other network unit capable to communicate over a radio carrier with user equipments being present in the cell.

One or more user equipments 120, 130 being present within the cell 115, are served by the base station 110, and are therefore capable of communicating with the base station 110 over a respective radio carrier 125, 135. There may be several user equipments within the cell 115, but only two are depicted in FIG. 1 for the sake of simplicity. The user equipments 120 and 130 may be terminals, e.g. mobile terminals or wireless terminals, mobile phones, computers such as e.g. laptops, Personal Digital Assistants (PDA), or any other radio network units capable to communicate with a base station over a radio carrier.

The base station 110 may comprise a scheduler or any other similar unit. The scheduler divides the total power, time and frequency, or channelization code resources between user equipments need in both LTE and WCDMA, i.e. it schedules the data and signalling to each user onto the sub-carriers for each time slot.

With channel dependent scheduling a scheduling algorithm in the base station 110 may use an estimate of the throughput that would be obtained for an envisaged mapping of a user equipment to resources. The throughput estimate may often be weighted together with other criterions based on priority and service requirements. The final scheduling selecting is often a result of a weighted combination of criterions.

Figure 2:
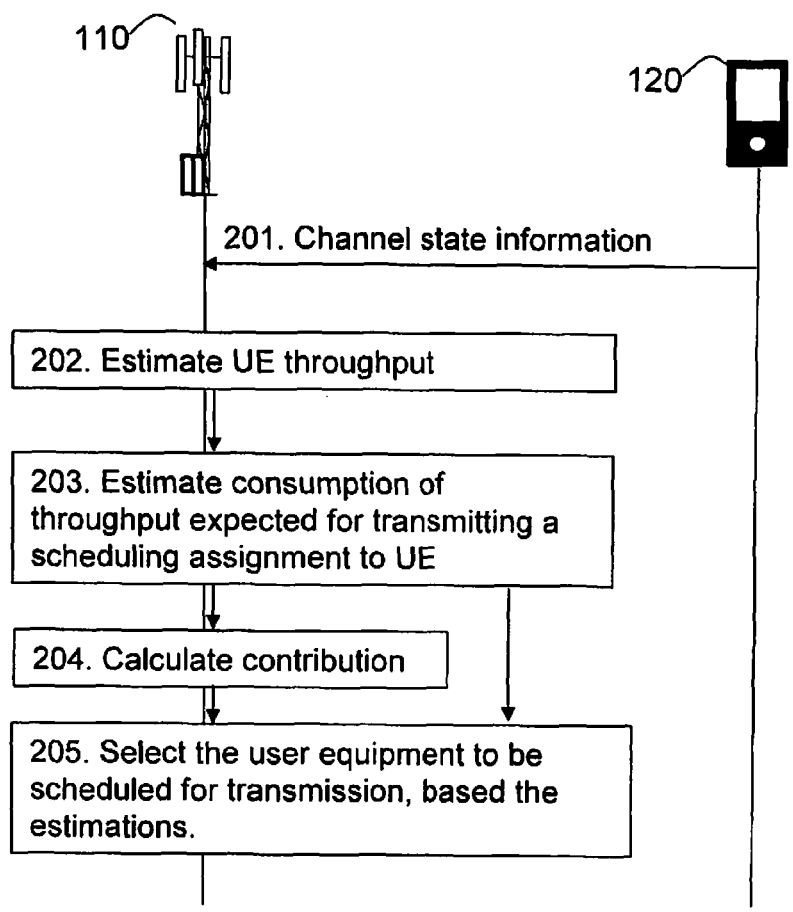
FIG. 2 is a combined schematic block diagram and flowchart depicting embodiments of a method.

The present solution relating to a method in the base station 110 for selecting one or more user equipments 120, 130 to be scheduled for a respective transmission according to some general embodiments will now be described with reference to the combined signalling diagram and flowchart depicted in FIG. 2 and to the block diagram depicted in FIG. 3. As mentioned above, the base station 110 is comprised in the wireless communications network 100. In some embodiments, the respective one or more user equipments 120, 130 are selected for the transmission on orthogonal resources such as orthogonal channelization codes in a Code Division Multiple Access (CDMA) system or in a WCDMA system, or resource blocks in an Orthogonal Frequency Division Multiplexing (OFDM) system. In some embodiments, the respective one or more user equipments 120, 130 may be selected for the transmission on channelization codes in a High Speed Packet Access (HSPA) system. The method comprises the following steps, which steps may as well be carried out in another suitable order than described below:

Step 201. The base station 110 receives channel state information from the respective one or more user equipments 120, 130. This step may be performed by a receiver 310 in the base station 110.

The channel state information may be measured by the respective one or more user equipments 120, 130.

Step 202. The base station 110 estimates the throughput of the transmission to the of the respective one or more user equipments 120, 130. The throughput is based on the received channel state information. The throughput may be estimated in information bits per unit of time. This step may be performed by an estimating unit 320 within the base station 110.

Step 203. The base station 110 estimates the consumption of throughput that is expected for transmitting a scheduling information to the respective one or more user equipments 120, 130. The consumption of throughput may be estimated in information bits per unit of time. This step may also be performed by the estimating unit 320 within the base station 110.

In WCDMA and LTE a recommended transport format report may be comprised in the consumption of throughput, which report provides a network specified Block Error Rate (BLER). The report may be further processed to mitigate inaccuracies in the user equipment 120 measurements.

In some embodiments, the consumption of throughput that is expected for transmitting the scheduling information comprises the consumption of throughput for transmitting a resource assignment such as e.g. a scheduling map, and a selected transport format. The resource assignment may be represented by a scheduling map. In these embodiments, the consumption of throughput for transmitting the resource assignment may be dependent on how the scheduling map is represented, such as e.g. a joint scheduling map or individual maps. As an alternative in these embodiments, the consumption of throughput for transmitting the resource assignment may be dependent on the Downlink Control Information (DCI) allocation type, i.e. if the allocation is fragmented or consecutive in frequency scheduling map.

In some other embodiments, the consumption of throughput that is expected for transmitting the scheduling information may be dependent on the channel quality of the respective one or more user equipments 120, 130.

Step 204. The base station 110 then may calculate the contribution of throughput of the respective one or more user equipments 120, 130 by subtracting the estimated consumption of throughput that is expected for signalling a scheduling information to the respective one or more user equipments (120, 130) from the estimated throughput. The criterion in the next step may be related to the calculated result of the subtracting. This step may be performed by a calculating unit 330 within the base station 110.

Step 205. The base station 110 selects the respective one or more user equipments 120, 130 to be scheduled for transmission based on a criterion. The estimated throughput and the estimated consumption of throughput that is expected for transmitting the scheduling information to the user equipment 120 are used in the criterion. This step may be performed by a scheduling unit 340 within the base station. The estimating unit 320, the calculating unit 330 and the scheduling unit 340 may be comprised in a scheduler within the base station or be located as separate units within the base station 110.

Figure 4:
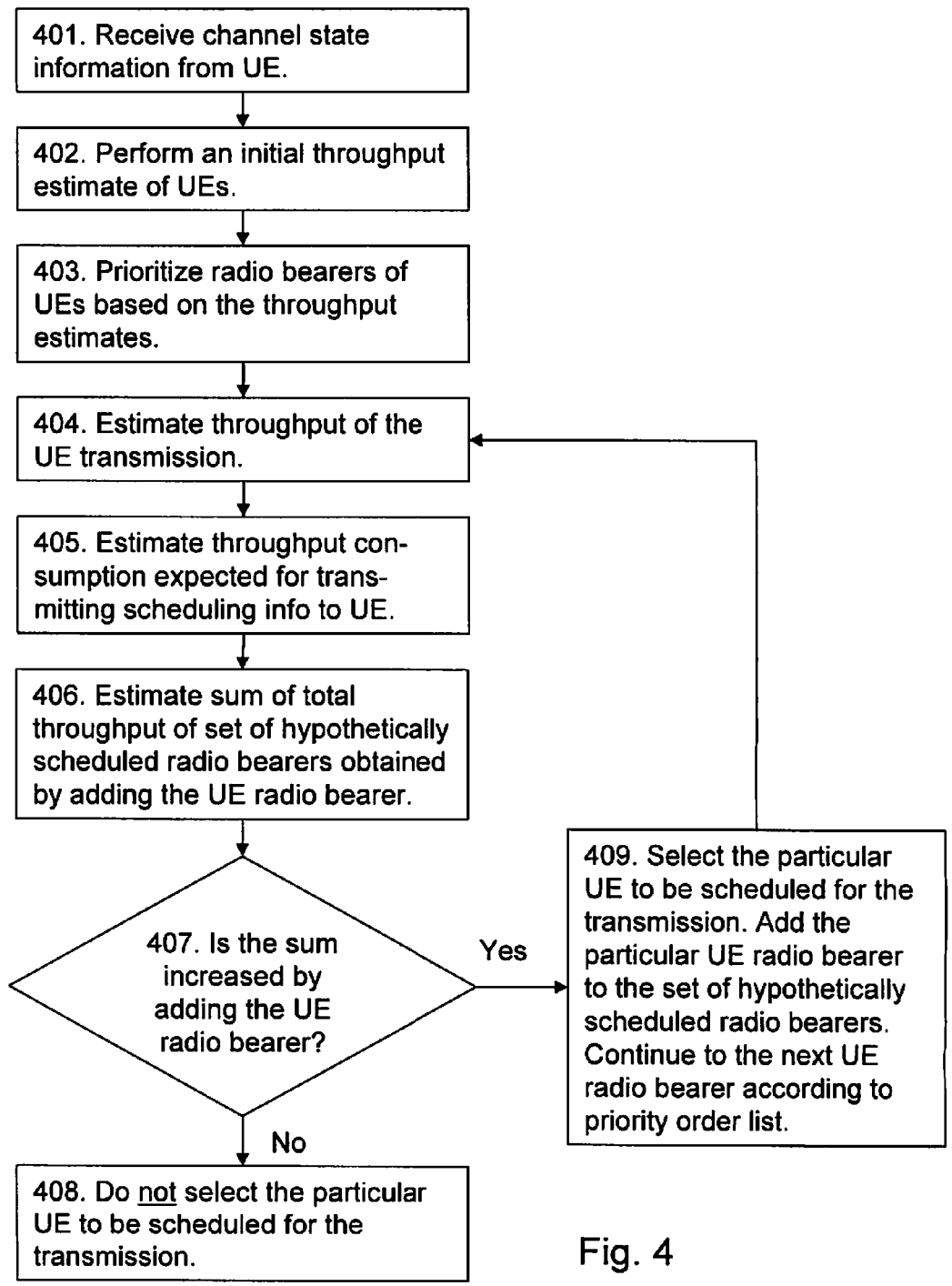
FIG. 4 is a flowchart depicting embodiments of a method.

The present solution relating to a method in the base station 110 for selecting one or more user equipments 120, 130 to be scheduled for a respective transmission according to some embodiments will now be described with reference to the flowchart depicted in FIG. 4.

According these embodiments the base station 110 handles plural of user equipments 120, 130 being present in the cell 115 served by the base station 110.

Step 401. The base station 110 receives channel state information from each of the respective user equipments 120, 130. This step corresponds to step 201 above.

Step 402. The base station 110 may perform an initial throughput estimate for the respective user equipments 120, 130. The throughput estimate may be based on the channel state information where a recommended transport format may be reported, providing a network specified BLock Error Rate (BLER). The report may be further processed to mitigate inaccuracies in the user equipment 120 measurements.

Step 403. The base station 110, e.g. a scheduler within the base station 110, may assign radio bearers resources to the user equipments 120, 130 sequentially according to some priority. Each user equipment 120, 130 may have several radio bearers of different priority, i.e. higher layer signalling bearers, Guaranteed Bit Rate (GBR) bearers, best effort etc. The priority order is typically based on scheduling priority composed of several factors such as

- User equipment channel quality. User equipments with better relative channel quality may be prioritized. A user equipment reported channel quality may be seen as an estimate of the user equipment's data throughput on the corresponding radio resource, if scheduled.
- Radio access bearer priority. E.g. bearers carrying signalling, emergency calls, etc. are prioritized.
- Service requirements, through the Quality of service Class Indicator (QCI)
- User priority. "Gold subscriptions" may be prioritized.
- Delay. Data packets from delay-sensitive services may be prioritized when the packets are close to reach their critical delay limit.
- Etc.

I.e., the base station 110 may place the radio bearers assigned to the user equipments 120, 130 in priority order list based on the initial throughput estimates in Step 402.

In any suitable order, preferably by starting with the highest prioritized radio bearer, for each radio bearer assigned to a user equipment 120, 130, the scheduler in the base station 110 then performs the method steps below to find out if the particular radio bearer of a user equipment 120, 130 shall be added to a set of hypothetically scheduled radio bearers assigned to the user equipments 120, 130. The base station 110 may sequentially make up the set of hypothetically scheduled radio bearers as an intermediate step. Once the scheduling is finalized according to certain criterions the set of hypothetically scheduled users may be selected to be scheduled.

The steps below may as well be carried out in another suitable order than described here.

Step 404. The base station 110 estimates the throughput of the transmission of the user equipment 120, 130. The throughput is based on the received channel state information. The throughput may be estimated in information bits per unit of time. This step corresponds to step 202 above.

Step 405. The base station 110 estimates the additional consumption of throughput that is expected for transmitting the scheduling information to the user equipment 120, 130. The consumption of throughput may be estimated in information bits per unit of time. The base station 110 may then calculate the contribution of throughput of the radio bearer assigned to the user equipment 120, 130 when being added to the set of hypothetically scheduled radio bearers assigned to the user equipments 120, 130. The contribution of throughput may be calculated by subtracting the estimated consumption of throughput that is expected for signalling a scheduling information to the respective one or more user equipments 120, 130, from the estimated throughput. In some embodiments, the criterion is related to the calculated contribution. This step corresponds to step 203 above.

Step 406

The base station 110 estimates the sum of the total throughput of the set of hypothetically scheduled radio bearers obtained by adding the radio bearer assigned to the user equipment 120, 130, taking into account the above estimated signalling cost or the calculated result of subtracting, i.e., the additional signalling cost for adding the radio bearer assigned to the user equipment 120, 130 to the set of hypothetically scheduled radio bearers. This step corresponds to step 204 above.

Step 407. The base station 110 then checks if the criterion is fulfilled, i.e. if the estimated sum of the total throughput for the set of hypothetically scheduled radio bearers assigned to user equipments, will be increased by adding the particular radio bearer assigned to the user equipment 120, 130. If the contribution in throughput by adding the particular radio bearer is larger than the additional throughput consumed by transmitting the scheduling information, the total throughput will increase.

Step 408. In some embodiments, when the total throughput will not be increased by adding the particular radio bearer assigned to the user equipment 120, 130, the base station 110 will not select the particular radio bearer assigned to the user equipment 120, 130 to be scheduled for a transmission, and will not add the particular radio bearer assigned to the user equipment 120, 130 to the set of hypothetically scheduled radio bearers. The base station 110 may terminates the scheduling, i.e. no more radio bearers will be added to the set of hypothetically scheduled radio bearers assigned to the user equipments 120, 130. The base station 110 may selects the set of hypothetically scheduled radio bearers as scheduled radio bearers assigned to the user equipments 120, 130 and transmit according to the resulting scheduling set.

Step 409. When the total throughput will be increased by adding the particular radio bearer assigned to the user equipment 120, 130, the base station 110 then selects the particular user equipment 120, 130 to be scheduled for a transmission and adds the particular radio bearer assigned to the user equipment 120, 130, to the set of hypothetically scheduled radio bearers. The base station 110 then may update the resources needed for the transmission. The base station may continue to the next radio bearer assigned to a user equipment 120, 130, according to the priority order list.

How to estimate the additional cost of scheduling a user equipment depends on the system and how scheduling information are represented and signaled to the user equipment 120, which will be further described here referring to some example embodiments using OFDM systems. In these embodiments a sub-frame is a set of consecutively transmitted OFDM symbols. Typically a dedicated set of OFDM symbol(s) in each sub-frame are used for transmitting physical layer control signalling, containing for example scheduling maps. There may also be a possibility to vary the number of symbols used for signalling, for example in LTE the number of symbols used for signalling may be 1, 2 or 3.

The time/frequency domains are quantized into resource blocks, where a resource block represents the smallest time/frequency entity that can be scheduled to the user equipment 120, 130. In each sub-frame, a scheduling map is signaled to the user equipments indicating what user equipments have been scheduled and on which resource blocks. A scheduling map may be represented in several ways:

In a joint scheduling map representing the entire scheduling map, which may be broadcasted to all user equipments 120, 130, so that all user equipments 120, 130 get information about the entire allocation map.

Individual maps are sent to each user equipment 120, 130 indicating the assigned resources for that user equipment. This map may for example consist of a bit sequence where for each resource block or resource block group a "1" means that the user equipment 120, 130 is assigned to the corresponding resource block(s) and where a "0" means that the user is not assigned to the corresponding resource block.

For the first example with joint representation, size of scheduling map does not increase in itself with more user equipments being scheduled; however the channel coding and/or power is to be adjusted to the user equipment 120, 130 with the poorest channel estimate.

For the example with individually transmitted information, which is the case for LTE, the channel coding and/or power may be adjusted according to the individual user equipments need.

In both examples, the sequences may be run-length coded to reduce the number size of the scheduling information, in bits.

Figure 5:
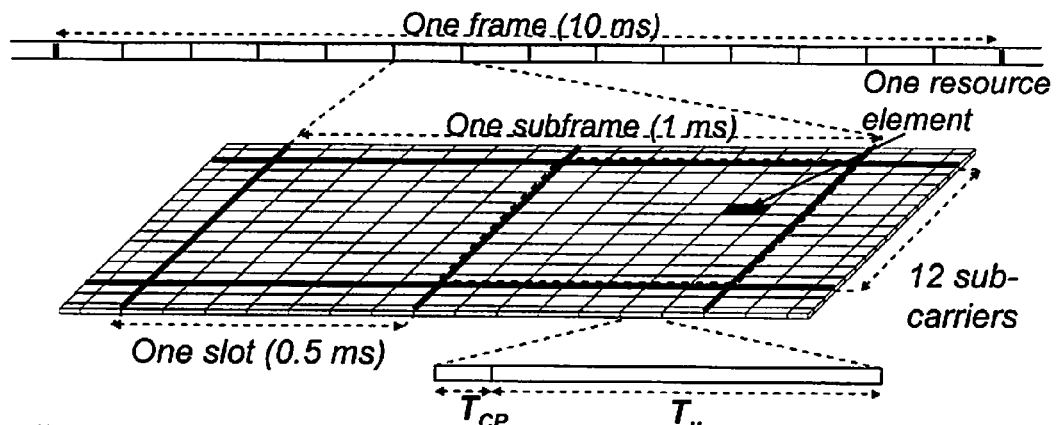
FIG. 5 is a schematic block diagram illustrating time and frequency domain structure for LTE.

The time and frequency domain structure for LTE is illustrated in FIG. 5. The time domain is structured 10 ms frames comprising ten 1 ms subframes. Each subframe comprises two 0.5 ms slots. This corresponds to 6-7 OFDM symbols depending on the cyclic prefix, 6 in case of extended cyclic prefix. A resource element is one sub-carrier during one OFDM symbol. A resource block is a time/frequency entity comprising consecutive 12 subcarriers during one slot. A scheduling block comprises 12 consecutive subcarriers in a subframe and is the smallest entity that can be assigned to a user.

LTE supports dynamic scheduling per subframe (1 ms). For each subframe the base station 110 may signal the scheduling information, describing what scheduling blocks are assigned to what user equipment 120, 130 and what transport format, i.e. transmission parameters, are used.

Figure 6:
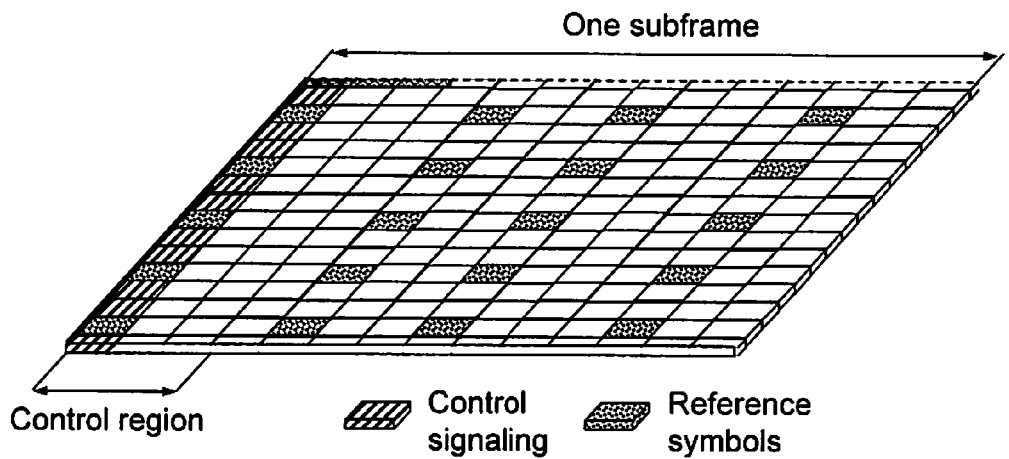
FIG. 6 is a schematic block diagram illustrating a sub frame.

FIG. 6 shows control region, control signalling and reference symbols in one subframe. The control region in LTE may comprise 1, 2 or 3 OFDM symbols in each subframe. As illustrated in FIG. 6, the first 1, 2 or 3 OFDM symbols in each subframe is reserved for physical layer control signalling. This control region carries the Physical Control Format Indicator Channel (PCFICH), the Physical Hybrid ARQ Indicator Channel (PHICH) and the Physical Downlink Control Channel (PDCCH).

The PCFICH indicates the number of OFDM symbols used for the control region and is mapped to four resource-element groups in first OFDM symbol. The PHICH carries the Hybrid-ARQ acknowledgements for uplink transmissions.

Finally the PDCCH may be used to carry the Downlink Control Information (DCI) including the scheduling information. There are several DCI formats, see Table 1 below, characterized by different size and type of assignment, uplink, downlink, if the assignment is contiguous in frequency or fragmented. There are also different formats for different Multiple Input Multiple Output (MIMO) formats i.e. multiple transmit and receive antennas. The 0 in the "Uplink" grant column means that this format applies to Uplink grants, i.e. there is only one format, 1A, which is used for uplink grants.

TABLE 1

Different DCI formats.

| Uplink grant | | Downlink assignment |
|---|---|---|
| — | 1C | Small contiguous allocations |
| 0 | 1A | Contiguous allocations only |
| — | 1B | Contiguous allocations with spatial multiplexing |
| — | 1D | Contiguous allocations with MU-MIMO (Multi-user MIMO) |
| — | 1 | Flexible allocations, no spatial multiplexing |
| — | 2 | Flexible allocations, full spatial multiplexing |

There are several PDCCH formats, as depicted in Table 2 below. The PDCCH is divided in Control Channel Elements (CCE) each CCE is mapped to a group of resource elements. The CCE's may be concatenated, 1, 2, 4 or 8, to provide means for link adaptation, i.e. more CCE's gives more PDCCH bits and this can be used for providing users in poor radio conditions a more robust coding.

TABLE 2

Possible PDCCH formats.

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

In the following an example embodiment of how the present solution may be applied in more detail to the LTE framework.

Initially the scheduler may assume that only one OFDM symbol is needed for the entire control region. This means that the scheduler in the base station 110 assumes that the other two symbols may be used for scheduling data if the control region comprises three subframes as indicated above. The scheduler in the base station 110 compiles a priority list of radio bearer assigned to the user equipments 120, 130 in a similar way as described above in step 403.

E.g. starting with the highest prioritized radio bearer assigned to the user equipment 120, 130, the scheduler in the base station 110 then estimates the number of CCE's needed for adding the concerned radio bearer assigned to the user equipment 120, 130, to the set of hypothetically scheduled radio bearers assigned to the user equipments 120, 130. The number of CCE's needed may depend e.g. on the DCI type and/or the code rate needed based on estimated channel quality, e.g. CSI. This corresponds to step 404 and 405 above.

The scheduler in the base station 110 may then checks if the current control region can support the increased number of CCE's needed. This also corresponds to step 405 since if the number of CCE's can be accommodated in the current control region, the additional consumption of throughput for signalling the scheduling information is zero.

If the current control region can support the increased number of CCE's needed the base station 110 adds the concerned radio bearer assigned to the user equipment 120, 130 to the set of hypothetically scheduled radio bearers and continues to the next radio bearer resource assigned to a user equipment 120, 130 according to the priority list, in a similar way as described above in step 409.

If the current control region can not support the increased number of CCE's needed, the scheduler in the base station 110 may check if the control region already comprises the maximum allowed number OFDM symbols.

If it already comprises the maximum allowed number of OFDM symbols, the scheduler in the base station 110 terminates the scheduling and transmits according to the resulting scheduling set in a similar way as described above in step 408.

If it does not already comprises the maximum allowed number of OFDM symbols, the scheduler in the base station 110 may performs the following steps:

Increasing hypothetically the control region to support the increased number of CCE's. This step is similar as step 405 described above.

Re-estimating the total throughput for the set of hypothetically scheduled radio bearers, considering the increased control region. This step is similar as step 404 described above.

Checking if the total throughput, comprising the sum of all users throughput in the list of hypothetically scheduled users, is increased by adding the user.

If the sum is increased, the scheduler in the base station 110 the base station 110 may add the particular radio bearer assigned to the user equipment 120, 130 to the set of hypothetically scheduled radio bearers, updates the control region by increasing hypothetically the control region to support the increase number of CCE's, and continues to the next radio bearer resource assigned to a user equipment 120, 130, according to the priority list. This corresponds to Step 408.

If the sum is not increased, the base station 110 terminates the scheduling. This corresponds to Step 409.

Embodiments of the base station 110, performing the method steps above for selecting one or more user equipments 120, 130 to be scheduled for a transmission, will now be further described with reference again to FIG. 3. As mentioned above, the base station 110 is comprised in a wireless communications network 100. The respective one or more user equipments 120, 130 may be selected for a transmission on orthogonal resources such as orthogonal channelization codes in a CDMA or WCDMA system, or resource blocks in an OFDM system. The respective one or more user equipments 120, 130 may also be selected for a transmission on channelization codes in a HSPA system.

The base station 110 comprises the receiver 310 configured to receive channel state information from the respective one or more user equipments 120, 130.

The base station 110 further comprises the estimating unit 320 configured to estimate the throughput of the transmission of the respective one or more user equipments 120, 130. The throughput is based on the received channel state information, and which throughput may be estimated in information bits per unit of time.

The estimating unit 320 is further configured to estimate the consumption of throughput that is expected for transmitting a scheduling information to each of the respective one or more user equipments 120, 130. The respective consumption of throughput may be estimated in information bits per unit of time.

In some embodiments the consumption of throughput that is expected for transmitting scheduling information comprises the consumption of throughput for transmitting a resource assignment and a selected transport format.

In some embodiments the resource assignment is represented by a scheduling map. In these embodiments the consumption of throughput for transmitting the resource assignment may be dependent on how the scheduling map is represented.

In some embodiments the consumption of throughput for transmitting the resource assignment is dependent on the DCI allocation type.

In some embodiments the consumption of throughput that is expected for transmitting a scheduling information is dependent on the channel quality of the respective one or more user equipments 120, 130.

The base station 110 may further comprise the calculating unit 330 configured to calculate the contribution of throughput of the respective one or more user equipments 120, 130 by subtracting the estimated consumption of throughput that is expected for signalling a scheduling information to the respective one or more user equipments 120, 130 from the estimated throughput. The calculated result of subtracting may be used as the criterion.

The base station 110 further comprises the scheduling unit 340 configured to select the respective one or more user equipments 120, 130 to be scheduled for transmission based on a criterion. The estimated throughput and the estimated consumption of throughput that is expected for transmitting the scheduling information to the respective one or more user equipments 120, 130 are used in the criterion.

In some embodiments the scheduling unit 340 is configured to select plural user equipments 120, 130 to be scheduled for a transmission. In these embodiments the estimation unit 320 may be configured to perform the estimation of the throughput of the transmission of the respective one or more user equipments 120, 130, and the estimation of the consumption of throughput that is expected for transmitting a scheduling information to each of the respective one or more user equipments 120, 130, for each radio bearer assigned to the respective plural user equipments 120, 130.

In some further embodiments the scheduling unit 340 is also configured to select plural user equipments 120, 130 to be scheduled for a transmission. In these embodiments the base station 110 further comprises a priority unit 350 configured to place radio bearers assigned to each of the respective user equipments 120, 130 in a priority order. The estimation unit 320 may be configured to start to perform the estimation of the throughput of the transmission of the respective one or more user equipments 120, 130, and the estimation of the consumption of throughput that is expected for transmitting a scheduling information to each of the respective one or more user equipments 120, 130, with the highest prioritized radio bearer assigned to each user equipment 120, 130.

In these to latter embodiments, the estimating unit 320 may further be configured to estimate the sum of the total throughput of the set of hypothetically scheduled radio bearers obtained by adding the radio bearer assigned to the user equipment 120, 130.

In these embodiments the criterion to find out if the particular radio bearer of a user equipment 120, 130 shall be added to a set of hypothetically scheduled radio bearers assigned to the user equipments 120, 130 may be represented by: whether the estimated sum of the total throughput for the set of hypothetically scheduled radio bearers assigned to user equipments, will be increased or not by adding the particular radio bearer assigned to the user equipment 120, 130.

Figure 3:
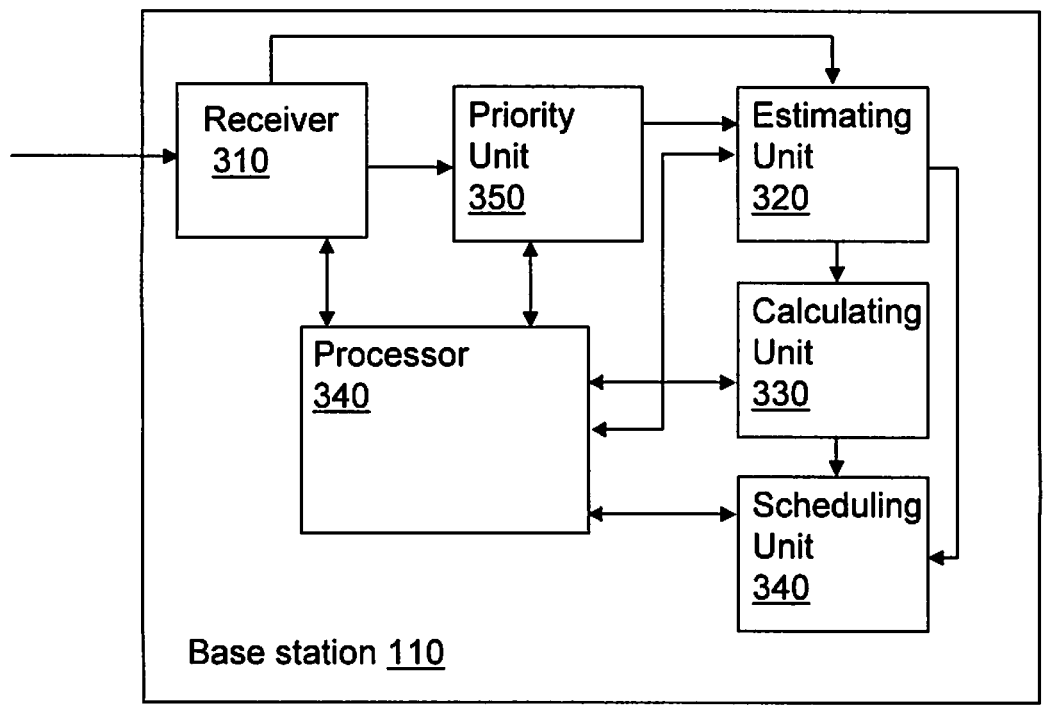
FIG. 3 is a schematic block diagram illustrating embodiments of a base station.

The present mechanism for selecting one or more user equipments 120, 130 to be scheduled for a transmission, may be implemented through one or more processors, such as a processor 360 in the base station 110 depicted in FIG. 3, together with computer program code for performing the functions of the present solution. The program code mentioned above may also be provided as a computer program product, for instance in the form of a data carrier carrying computer program code for performing the present solution when being loaded into the base station 110. One such carrier may be in the form of a CD ROM disc. It is however feasible with other data carriers such as a memory stick. The computer program code can furthermore be provided as pure program code on a server and downloaded to the base station 110.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for selecting one or more user equipments to be scheduled for a transmission in a wireless communications network, the method comprising:
    receiving channel state information from the respective one or more user equipments;
    estimating a transmission throughput for the respective one or more user equipments, based on the received channel state information;
    estimating a consumption of throughput that is expected for transmitting scheduling information to each of the respective one or more user equipments;
    selecting the respective one or more user equipments to be scheduled for transmission based on a criterion that is based on the estimated throughput and the estimated consumption of throughput that is expected for transmitting the scheduling information to the respective one or more user equipments.

2. The method of claim 1, wherein the respective one or more user equipments are selected for a transmission on orthogonal resources.

3. The method of claim 2, wherein said orthogonal resources are one of:
    orthogonal channelization codes in a Code Division Multiple Access (CDMA) or Wideband CDMA (WCDMA) system; and
    resource blocks in an Orthogonal Frequency Division Multiplexing (OFDM) system.

4. The method of claim 1, further comprising:
calculating the contribution of throughput of the respective one or more user equipments by subtracting the estimated consumption of throughput that is expected for signaling a scheduling information to the respective one or more user equipments from the estimated throughput, which calculated result of subtracting is used as the criterion.

5. The method of claim 1, wherein the consumption of throughput that is expected for transmitting a scheduling information comprises the consumption of throughput for transmitting a resource assignment and a selected transport format.

6. The method of claim 5, wherein the resource assignment is represented by a scheduling map, and wherein the consumption of throughput for transmitting the resource assignment is dependent on how the scheduling map is represented.

7. The method of claim 5, wherein the consumption of throughput for transmitting the resource assignment is dependent on the Downlink Control Information (DCI) allocation type.

8. The method of claim 1, wherein the consumption of throughput that is expected for transmitting a scheduling information is dependent on the channel quality of the respective one or more user equipments.

9. The method of claim 1, wherein the respective one or more user equipments is selected for a transmission on channelization codes in a High Speed Packet Access (HSPA) system.

10. The method of claim 1, wherein the method is performed for selecting plural user equipments to be scheduled for a transmission, and wherein the method of claim 1 is performed for each of a plurality of radio bearers assigned to the respective plural user equipments.

11. The method of claim 1, wherein the method is performed for selecting plural user equipments to be scheduled for a transmission, the method further comprising:
placing radio bearers assigned to each of the respective user equipments in a priority order, and
wherein the method of claim 1 is performed starting with the highest prioritized radio bearer assigned to each user equipment.

12. The method of claim 10, wherein the base station then performs the method steps to find out if the particular radio bearer of a user equipment shall be added to a set of hypothetically scheduled radio bearers assigned to the user equipments, the method further comprising:
estimating the sum of the total throughput of the set of hypothetically scheduled radio bearers obtained by adding the radio bearer assigned to the user equipment, and
wherein the criterion comprises whether the estimated sum of the total throughput for the set of hypothetically scheduled radio bearers assigned to user equipments, will be increased or not by adding the particular radio bearer assigned to the user equipment.

13. A base station for selecting one or more user equipments to be scheduled for a transmission in a wireless communications network, the base station comprising:
a receiver configured to receive channel state information from the respective one or more user equipments;
an estimating unit configured to estimate a transmission throughput of the respective one or more user equipments, which throughput is based on the received channel state information;
the estimating unit further being configured to estimate a consumption of throughput that is expected for transmitting scheduling information to each of the respective one or more user equipments;
the base station further comprising a scheduling unit configured to select the respective one or more user equipments to be scheduled for transmission based on a criterion, wherein the criterion is based on the estimated throughput and the estimated consumption of throughput that is expected for transmitting the scheduling information to the respective one or more user equipments.

14. The base station of claim 13, wherein the respective one or more user equipments are selected for selected for a transmission on orthogonal resources.

15. The base station of claim 14, wherein said orthogonal resources are one of:
orthogonal channelization codes in a Code Division Multiple Access (CDMA) or Wideband CDMA (WCDMA) system; and
resource blocks in an Orthogonal Frequency Division Multiplexing (OFDM) system.

16. The base station of claim 13, further comprising:
a calculating unit configured to calculate the contribution of throughput of the respective one or more user equipments by subtracting the estimated consumption of throughput that is expected for signalling a scheduling information to the respective one or more user equipments from the estimated throughput, which calculated result of subtracting is used as the criterion.

17. The base station of claim 13, wherein the consumption of throughput that is expected for transmitting a scheduling information comprises the consumption of throughput for transmitting a resource assignment and a selected transport format.

18. The base station of claim 17, wherein the resource assignment is represented by a scheduling map, and wherein the consumption of throughput for transmitting the resource assignment is dependent on how the scheduling map is represented.

19. The base station of claim 17, wherein the consumption of throughput for transmitting the resource assignment is dependent on the Downlink Control Information (DCI) allocation type.

20. The base station of claim 13, wherein the consumption of throughput that is expected for transmitting a scheduling information is dependent on the channel quality of the respective one or more user equipments.

21. The base station of claim 13, wherein the respective one or more user equipments is selected for a transmission on channelization codes in a High Speed Packet Access (HSPA) system.

22. The base station of claim 13, wherein the scheduling unit further is configured to select plural user equipments to be scheduled for a transmission, wherein the estimation unit is configured to perform the estimation of the throughput of the transmission of the respective one or more user equipments, and the estimation of the consumption of throughput that is expected for transmitting a scheduling information to each of the respective one or more user equipments, for each of a plurality of radio bearers assigned to the respective plural user equipments.

23. The base station of claim 13, wherein the scheduling unit further is configured to select plural user equipments to be scheduled for a transmission, the base station further comprises:

a priority unit configured to place radio bearers assigned to each of the respective user equipments in a priority order, wherein the estimation unit is configured to start to perform the estimation of the throughput of the transmission of the respective one or more user equipments, and the estimation of the consumption of throughput that is expected for transmitting a scheduling information to each of the respective one or more user equipments, with the highest prioritized radio bearer assigned to each user equipment.

24. The base station of claim 22, wherein the estimating unit further is configured to estimate the sum of the total throughput of the set of hypothetically scheduled radio bearers obtained by adding the radio bearer assigned to the user equipment, and wherein the criterion to find out if the particular radio bearer of a user equipment shall be added to a set of hypothetically scheduled radio bearers assigned to the user equipments comprises whether the estimated sum of the total throughput for the set of hypothetically scheduled radio bearers assigned to user equipments, will be increased or not by adding the particular radio bearer assigned to the user equipment.

* * * * *